May 20, 1952     E. H. APPEL     2,597,220
BALE LOADING MACHINE
Filed Dec. 20, 1948     2 SHEETS—SHEET 1
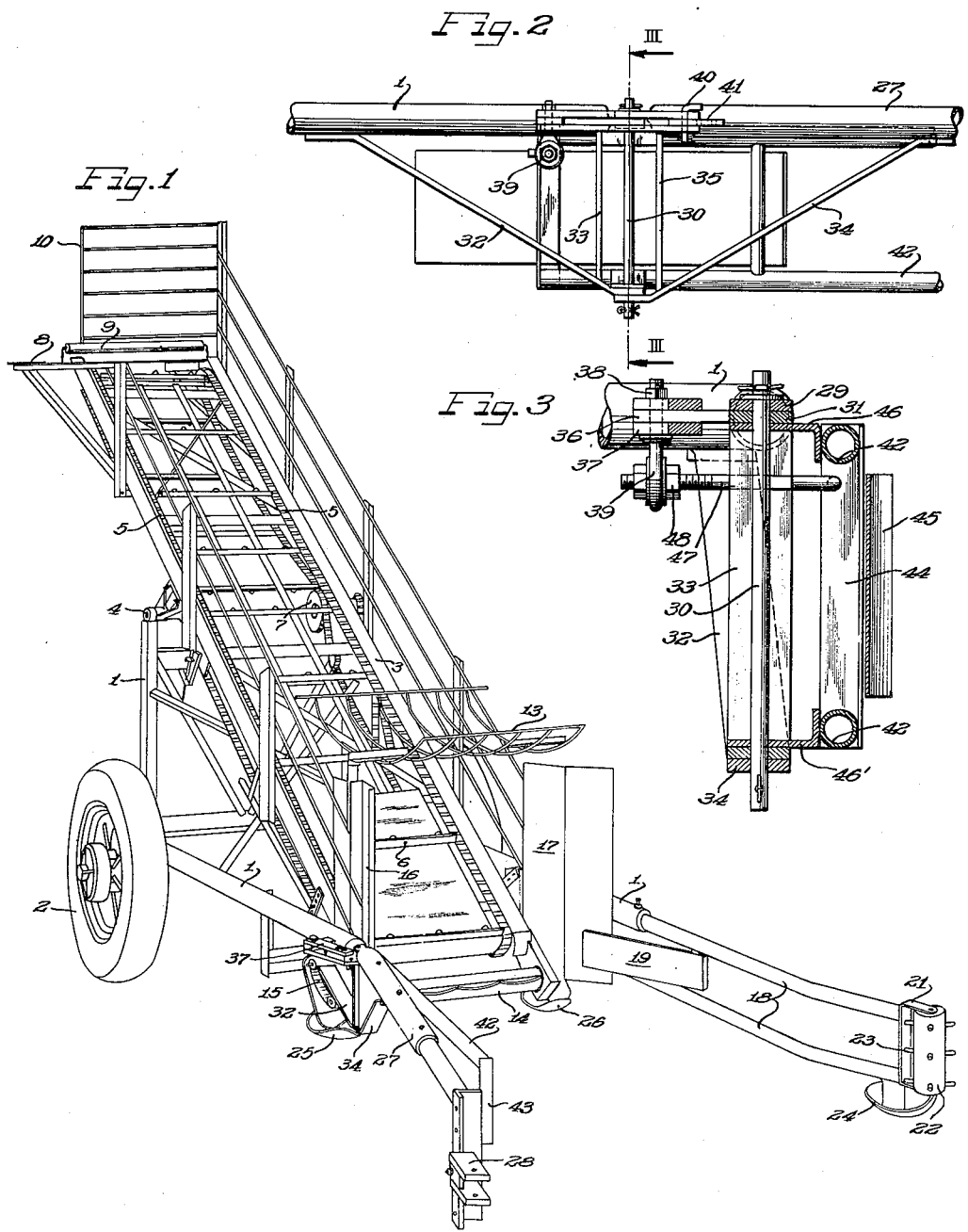
Inventor
Everett H. Appel
By ... Attys May 20, 1952   E. H. APPEL   2,597,220
BALE LOADING MACHINE
Filed Dec. 20, 1948   2 SHEETS—SHEET 2
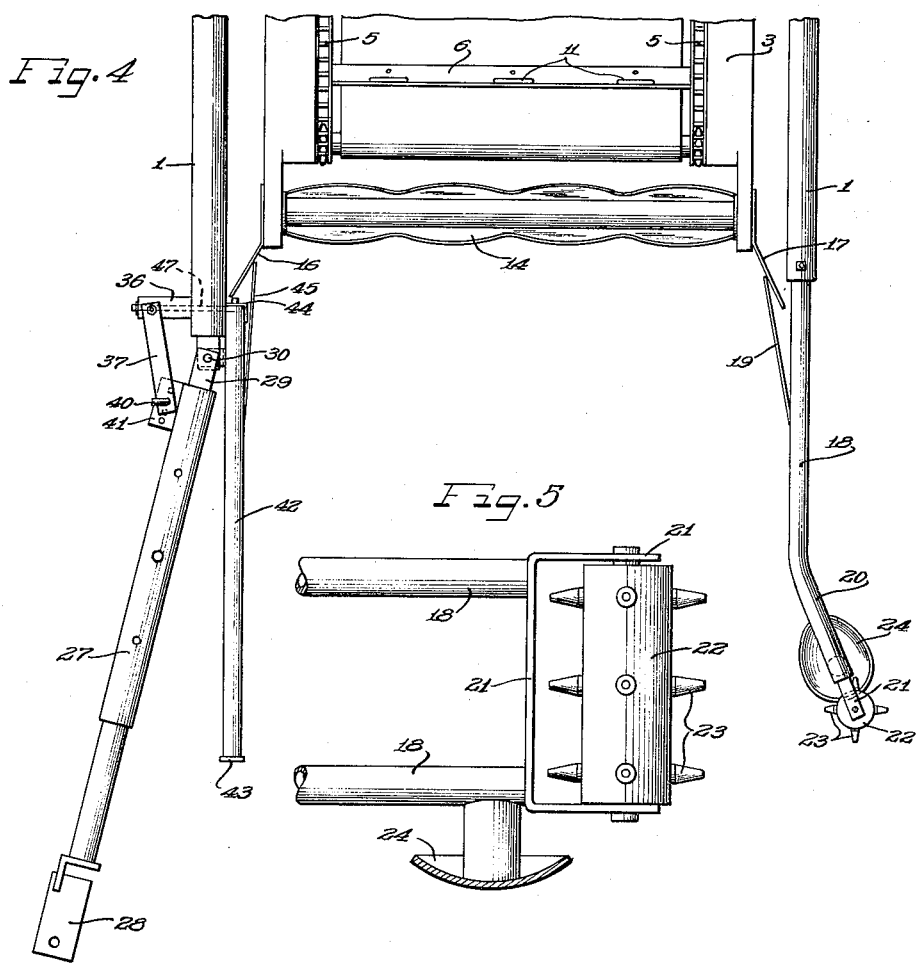
Inventor
Everett H. Appel Patented May 20, 1952

2,597,220

UNITED STATES PATENT OFFICE 2,597,220

BALE LOADING MACHINE

Everett H. Appel, Aurora, Ill.

Application December 20, 1948, Serial No. 66,241

11 Claims. (Cl. 198—9)

This invention relates to improvements in a bale loading machine, and more particularly to an agricultural loading machine of the type capable of elevating bales, shocks, and similar bound loads to a position for transfer to a transporting vehicle, the invention centering itself in such a machine equipped to more facilely handle such loads without injury to them, although the invention may have other uses and purposes as will be apparent to one skilled in the art.

The instant application is a continuation-in-part of my copending application entitled "Load Straightening Device for Loading Machines," filed October 17, 1947, Serial No. 780,437, and consequently a continuation-in-part of my previously filed application entitled "Agricultural Loading Machine," filed April 19, 1944, Serial No. 531,693, issued in Patent No. 2,460,441, February 1, 1949.

Machines of the character of the instant invention are constructed to be towed or driven adjacent to a transporting vehicle in the nature of a wagon, trailer, truck, or the like, so that after the bale or other load has been elevated to a proper height by virtue of the loading machine, it may be easily transferred into the body of the transporting vehicle. The idea is to have both the transporting vehicle and the loading machine continuously travel along together and pick up all bales in a row across a field, regardless of the disposition or position of the bales in the row. Obviously, such a loading machine must be able to handle both round or square bales, a round bale being substantially circular in cross section, and the square bale being substantially square or rectangular in cross section.

In the past, considerable difficulty has been experienced in the handling of round bales in a continuous and facile manner. Machines for making round bales usually roll up the material to be baled in cylindrical form, and wrap it spirally with twine or equivalent binding material. One end of the binding element is stuck in the bale, and the other end frequently remains loose after the spiral winding. In nearly every instance such machines merely discharge the bale onto the ground with the long axis of the bale disposed transversely to the path of travel of a loading machine. Obviously, such a bale must be straightened before it can be acted upon by the loading machine; i. e., the long axis of the bale must be disposed parallel to the path of travel of the loading machine.

Many loading machines of the past were equipped with straightening means for shifting the position of the bale so that it could be picked up by the loading machine. Such straightening devices as heretofore known, however, were not as efficient as desirable in connection with round bales because of the tearing action upon the bale, and very frequently the loosening of the twine binding, especially if the ground was of such character as to offer even mild resistance to the shifting of positions of the bale.

Further, when the loading machine was traveling along sloping ground, that is ground that slanted downwardly toward the transporting vehicle, difficulty was frequently experienced with a round bale due to its rolling action after being straightened because of the bale rolling across the path of the loading machine and ending up against the hitch bar or drag link, thus requiring a stopping of the vehicles and a manual readjustment of the bale.

With the foregoing in mind, it is an important object of the instant invention to provide a loading machine equipped with straightening means capable of better handling both round and square bales than machines of the same character heretofore known.

Another object of the instant invention is the provision of a loading machine capable of facilely handling round or square bales, shocks, and similar agricultural loads, which machine is provided with a straightening arrangement projecting forwardly of the machine and carrying at its forward end a free running roller operating upon a substantially vertical axis for shifting the position of a bale, especially a round bale, without tearing the bale or disrupting the binding.

It is also an object of this invention to provide an agricultural loading machine capable of handling either round or square bales, shocks, and the like, which machine is equipped with straightening means projecting forwardly on one side thereof, and a projecting load bumper on the opposite side so that a round bale may be adjusted as to position, and prevented from rolling beyond pickup position even when operating upon sloping ground.

Another feature of the instant invention is the provision of a loading machine for bales, shocks, and the like, which machine includes an inclined loading trough with means for elevating a load along the trough, with a pivoted drag link projecting forwardly of the machine at one side, and a pivotal load bumper adjacent the drag link, with means for anchoring the relative angular position of both the drag link and the load bumper.

Still a further feature of the instant invention resides in the provision of an agricultural loading machine provided with wheels at the rear portion of the machine, and with ground skids at the forward portion of the machine so shaped as to slide over obstacles and ground formations and permit the ready turning of corners.

It is also a feature of this invention to provide an agricultural loading machine having an inclined loading trough with means to elevate loads therealong, such means being in the form of a flight conveyor equipped with efficient load engaging elements for firmly holding a load without injury thereto.

Still another object of the invention resides in the provision of an agricultural loading machine equipped with a rotary bale straightening element extending forwardly of the machine, and an angularly adjustable load bumper extending forwardly from the opposite side of the machine, to facilitate the handling of a bale disposed at any angle to the path of travel of the loading machine.

While some of the more salient features, characteristics and advantages of the instant invention have been above pointed out, others will become apparent from the following disclosures, taken in conjunction with the accompanying drawings, in which—

Figure 1 is a projectional pictorial view of a loading machine embodying principles of the instant invention;

Figure 2 is an enlarged fragmentary side elevational view of a structure seen in the lower central portion of Fig. 1, looking at such structure from the left hand side of the showing in Fig. 1;

Figure 3 is an enlarged fragmentary vertical sectional view, with parts shown in elevation, taken substantially as indicated by the line III—III of Fig. 2, looking in the direction of the arrows;

Figure 4 is a fragmentary enlarged top plan view of the forward end of the loading machine of Fig. 1;

Figure 5 is an enlarged fragmentary side elevational view, with one part shown in section, of the load straightening means seen in the lower right hand portion of Fig. 4; and Figure 6 is an enlarged fragmentary pictorial illustration of one of the flights of the load elevating means.

As shown on the drawings:

In the illustrated embodiment of the instant invention there is shown a mobile loading machine including a frame 1 to the rear portion of which is mounted a pair of traction wheels 2. A forwardly inclined loading trough 3 is pivoted to the frame in an intermediate location as indicated at 4 (Fig. 1) and means may be provided to maintain the lower and forward end of the loading trough normally elevated above the ground except when a load is being picked up, all as more fully explained and set forth in my aforesaid copending applications.

Means are provided to elevate a load along the trough 3, and in the illustrated instance these means are in the form of an endless conveyor of the flight type, including a pair of side chains 5—5 connected at spaced intervals by transverse cross bars 6 of angular shape. The entire conveyor may be driven by a suitable sprocket connection with one of the wheels 2, as indicated generally at 7 in Fig. 1. At the top of the loading trough there is a discharge platform 8, with a suitable free running load guiding roller 9 disposed at the forward end of that platform. A gate 10 extending upwardly from the rear portion of the discharge platform also serves in guiding a load sidewise off the platform into the transporting vehicle.

In order to insure a positive yet non-injurious gripping of the bale or other load by the conveyor, each of the flights 6 is provided with a plurality of spaced engaging elements 11, as best seen in Fig. 6. These elements are in the form of inverted substantially V-shaped rods, in the preferred construction, with the end portions of the rods secured to the flight 6. The apices 12 of the V-shaped rods are preferably rounded and project above the flights in the form of a loop to contact the load. A firm grip is thereby established upon the load, without danger of tearing or disruption of the load.

With reference now to Fig. 1 it will be seen that the forward portion of the loading trough is provided with a pivotal frame 13 under which a bale must pass when starting up the loading trough. This frame will knock down a bale that may be standing vertically on end upon the ground when the machine arrives to pick it up, and will press down upon the top of the bale entering the loading trough to insure a positive engagement of the bale by the flights on the conveyor. After the bale is passed up the conveyor beneath this frame, the rear portion of the frame will drop behind the upwardly moving bale, and the bale is prohibited from any unexpected or accidental downward movement.

A rotary pickup element 14 is provided just forwardly of the lower end of the conveyor, and this element may be driven by a suitable chain and sprocket arrangement 15 from the forward shaft of the conveyor. As this element engages a bale to elevate it upon the conveyor, the bale must pass through a pair of oppositely disposed guide plates or wings 16 and 17 each of which has an outwardly flaring or angularly disposed forward portion.

Projecting forwardly from the offside of the loading machine, that is the side away from the transporting vehicle, is a load straightening arrangement which includes a subframe 18 secured to the main frame 1. This subframe carries a backwardly extending guide plate 19, the rear edge of which contacts the flared portion of the aforesaid guide wing 17. Preferably the subframe 18 is fixed in position relatively to the main frame 1. The forward end of the subframe is outwardly turned as indicated at 20 in Fig. 4, and at the leading edge thereof it carries a yoke 21 in which a freely rotating roller 22 is journaled, as seen best in Fig. 5. It will be especially noted that the axis of the roller 22 is substantially vertical. This roller 22 is provided with a plurality of radially extending projections 23 in the general form of blunt ended teeth. If a load is disposed out of position relatively to the path of travel of the loading machine, and especially when that load is in the form of a round bale, the roller 22 with its teeth 23 engages the bale in a gentle but firm manner and with the rolling action shifts the bale into proper pickup position. It will be noted that the bale will not be torn, disrupted, or otherwise injured by virtue of the roller, nor will the binding of the bale be disrupted due to the fact that the teeth of the roller will turn away from that binding as the bale is being straightened.

Beneath the forward end of the subframe 18 is a fixed ground skid 24, preferably of substantially spoon shape. Similar ground skids 25 and 26 are provided beneath the forward ends of the main frame 1 on opposite sides of the loading trough as seen best in Fig. 1. As mentioned above, these skids may not be in contact with the ground at all times, but will be in contact with the ground when a load is being picked up, and by virtue of their peculiar shape they will avoid deviations in the ground surface by sliding thereover without any gouging action, and permit the ready turning of corners.

With reference now more particularly to Figs. 2, 3 and 4, it will be seen that a hitch bar or drag link 27, preferably of telescopic adjustable formation, is pivoted to the main frame 1 on the opposite side of the aforesaid subframe 18. At the leading end thereof this drag link carries suitable draw bar connection 28. The rear end of the drag link is flattened as indicated at 29 and pivotally associated with the upper end of a vertically disposed pivot pin 30 carried by the frame 1, as clearly seen in Fig. 3. This pin extends through a flat portion 31 on the end of the adjacent frame member 1 at the top, and extends through the lower end of a downwardly inclined brace 32 welded or equivalently secured to the frame, and reenforced by a vertically disposed brace 33, Fig. 2. In similar manner, the flattened end 29 of a drag link is associated with the upper portion of the pin, and the lower end of a downwardly sloping brace 34 is associated with the lower end of the pin. An upstanding brace reinforcing member 35 secured between the draw link and brace 34 rigidifies the structure.

In order to anchor the drag link 27 in a desired position of adjustment, simple means are provided. These means include a lug 36 projecting laterally from the adjacent frame member 1 with which is associated upper and lower holding bars 37 clamped in position by a suitable nut 38 engaged with the upwardly extending portion of a depending eyebolt 39. The free ends of the holding bars 37 may be anchored to the drag link by means of a pin 40 selectively engageable in any of a series of apertures in a bracket 41 extending from the drag link, as seen clearly in Fig. 4.

A forwardly projecting load bumper is also pivotally associated with the same pivot pin 30 and disposed adjacent to the drag link 27. The load bumper and drag link, however, are separate from each other, and may be separately adjusted relatively to each other and to the main frame of the machine. This load bumper comprises a frame made up, for example, of upper and lower parallel pipes 42—42 connected at the forward end by a vertical piece 43 and at the rear end by a vertical piece 44 (Fig. 3). On the inner side thereof this frame carries a plate 45, the rear end of which rests upon the flared portion of the aforesaid guide wing 46. Laterally projecting lugs 46—46 are welded or equivalently secured to the members 42—42 and are provided with suitable apertures through which the pivot pin 30 extends, as best seen in Fig. 3. In order to maintain the load bumper in a desired position of angular adjustment, a cross bolt 47 is provided, one end of which is anchored in the rear frame member 44 and the other end of which is threaded and extends through the aforesaid eyebolt 39, being engaged by a nut on each side of the eye of the bolt. Obviously by loosening the nuts 48, the load bumper may be swung to a desired position, and then the nuts may be tightened to hold the same in that position. It will be noted that the anchoring means for the drag link and the load bumper are separate and apart from each other, so that both the drag link and the load bumper are independently movable.

In operation, should the machine reach a bale, especially a round bale, that is out of line, that bale is easily and quickly straightened by means on the straightening arrangement including the vertically disposed roller 22. Should the machine be traveling along ground sloping toward the transporting vehicle, and a round bale when straightened start to roll, the bale will be brought to a halt by means of the load bumper and held in proper position to be picked up by the member 14 and the conveyor. While a load is being picked up, the spoon-like ground skids 24, 25 and 26 permit the free and easy forward movement of the machine regardless of ground contour. Depending upon conditions, and the character of the loads to be picked up, the drag link and load bumper may be independently adjusted and locked in any desired position of adjustment to better facilitate the entire operation. The looped grab members on the flights of the conveyor preferably engage a load without injury thereto. All in all, therefore, substantially any form of bale may readily and expeditiously be handled without injury by the machine while the machine continues its forward motion. It is to be especially noted that square bales as well as round are even more efficiently handled with the instant machine than was possible heretofore. The entire structure is highly efficient and economical both to manufacture and operate.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an agricultural loading machine, a rigid mobile frame, an inclined loading trough carried by said frame and pivotal relatively thereto, means to elevate a load along said trough, a drag link extending forwardly of said trough and pivoted for lateral movement adjacent one end to said frame, a load bumper adjacent said drag link and also pivoted for lateral movement at one end to said frame, means to anchor both said drag link and said load bumper in desired positions of lateral adjustment relatively to said frame, and load straightening means on the opposite side of said frame and extending forwardly of said trough and including a structure fixedly connected at one end to said frame.

2. In an agricultural loading machine, a rigid mobile frame, an inclined loading trough carried by said frame and pivotal relatively thereto, means to elevate a load along said trough, a drag link extending forwardly of said trough and pivoted for lateral movement adjacent one end to said frame, a load bumper adjacent to but separate from said drag link and also having an end pivoted to said frame to permit a lateral swing of said bumper, said load bumper being pivotal relatively to said frame and relatively to said drag link, separate means to anchor each of said drag link and said load bumper in desired positions of lateral adjustment relatively to said frame, and load straightening means projecting forwardly of said trough on the opposite side thereof from said load bumper and including a structure fixedly connected at one end to said frame.

3. In an agricultural loading machine, a mobile frame, an inclined loading trough on said frame, means to elevate a load along said trough, a vertically disposed pivot pin carried by said frame adjacent the forward and lower end of said trough, a drag link pivoted at one end to said pin, a load bumper separate from said drag link and also pivoted adjacent its rear end to said pin, separate holding means carried by said frame for anchoring each of said drag link and said load bumper in a desired position of angular adjustment, and a load straightening device projecting forwardly from the side of said frame opposite the load bumper.

4. In an agricultural loading machine, a mobile frame, an inclined loading trough on said frame, means to elevate a load along said trough, a pair of wheels carried at a rear part of said frame, opposed spoon-shaped ground skids on the front end of said frame, a drag link extending forwardly from said frame for connection to a power vehicle, a load straightening device extending forwardly from the opposite side of said frame from said drag link, and a spoon-shaped ground skid under the forward end of said straightening device.

5. In an agricultural loading machine, a rigid mobile frame, an inclined loading trough on said frame and pivotal relatively thereto, means to elevate a load along said trough, load pick-up means in front of the first said means, a drag link projecting forwardly of said trough on one side thereof, and a load straightening device connected to said frame and projecting forwardly of said pick-up means on the other side of said trough, said straightening device including a frame, and a roller at the forward end of the last said frame.

6. In an agricultural loading machine, a mobile frame, an inclined loading trough on said frame and pivotal relatively thereto, means to elevate a load along said trough, load pick-up means at the forward end of said trough, a drag link projecting forwardly of said trough on one side thereof, load straightening means including an elongated support connected to said frame and projecting forwardly of said pick-up means at the opposite side of said trough, and an idler roller mounted on the forward end of said support, the axis of said roller being substantially vertically disposed.

7. In an agricultural loading machine, a mobile frame, an inclined loading trough on said frame, means to elevate a load along said trough, a drag link projecting forwardly from said frame at one side of said trough, a forwardly projecting load bumper adjacent said drag link, a support projecting forwardly of said trough from the side of said frame opposite said load bumper, and a load straightening roller carried at the forward end of said support, said roller having its axis substantially vertical and carrying a plurality of radially projecting teeth.

8. A bale straightening arrangement for a bale loading machine, including an elongated support for fixed attachment at its rear end to the frame of a bale loading machine, a vertically mounted idler roller carried at the forward end of said support, and a series of radially extending projections on the surface of said roller.

9. A bale straightening arrangement for a bale loading machine, including an elongated support for attachment at its rear end to the frame of a bale loading machine, a vertically mounted roller carried at the forward end of said support, a series of radially extending projections on the surface of said roller, said roller being freely rotatable by contact with a bale, and a ground skid disposed beneath said support adjacent said roller.

10. A bale straightening arrangement for a bale loading machine, including an elongated support for attachment at its rear end to the frame of a bale loading machine, an idler roll having a substantially vertical axis on the outer end of said support, projections on the surface of said roller, and said support having an inward inclination rearwardly of said roller.

11. In an agricultural loading machine, a mobile frame, an inclined loading trough on said frame, means to elevate a load along said trough, means for connecting said mobile frame to a power vehicle at one side of the frame, a support extending well forwardly of said elevating means at the other side of said frame, an idler roll on a substantially vertical axis on the forward end of said support to contact a load and straighten the same, radially projecting prongs on said roll, a ground skid underneath the outer end of said support, and said support being outwardly inclined at least in part to carry said roll to one side of a straight path to said elevating means.

EVERETT H. APPEL.

REFERENCES CITED

The following references are of record in the file of this patent:

UNITED STATES PATENTS

| Number | Name | Date |
|---|---|---|
| 930,719 | Battee | Aug. 10, 1909 |
| 1,296,486 | Dick | Mar. 4, 1919 |
| 1,534,334 | Stutsman | Apr. 21, 1925 |
| 2,335,924 | Elholm | Dec. 7, 1943 |
| 2,353,094 | Veneziano | July 4, 1944 |
| 2,397,570 | Smoker | Apr. 2, 1946 |
| 2,408,863 | Lisota | Oct. 8, 1946 |
| 2,409,143 | McElhinney et al. | Oct. 8, 1946 |
| 2,542,446 | Abel | Feb. 20, 1951 |